United States Patent
Alber et al.

(10) Patent No.: US 6,786,060 B2
(45) Date of Patent: Sep. 7, 2004

(54) METHOD AND APPARATUS FOR DRYING A HEAT EXCHANGER IN A VEHICULAR AIR CONDITIONING SYSTEM

(75) Inventors: Samuel Alber, Neckartenzlingen (DE); Huub R. Kamsma, Filderstadt (DE); Arthur Thomas, Uden (DE); Marc D. Williams, Neckartenzlingen (DE); Maria List, Asperg (DE); Mark Reichler, Stuttgart (DE); Frank Vetter, Neuhausen (DE)

(73) Assignee: Modine Manufacturing Company, Racine, WI (US)

(*) Notice: Subject to any disclaimer, the term of this patent is extended or adjusted under 35 U.S.C. 154(b) by 0 days.

(21) Appl. No.: 10/396,848

(22) Filed: Mar. 25, 2003

(65) Prior Publication Data

US 2003/0217833 A1 Nov. 27, 2003

(30) Foreign Application Priority Data

Mar. 26, 2002 (DE) .......................................... 102 13 347

(51) Int. Cl.$^7$ ................................................ B60H 1/32
(52) U.S. Cl. .......................... 62/244; 62/275; 62/324.1; 165/42
(58) Field of Search .......................... 62/244, 275, 276, 62/324.1, 324.6; 165/42, 43; 237/12.3 A, 12.3 B

(56) References Cited

U.S. PATENT DOCUMENTS

| 2,284,914 A | * | 6/1942 | Miller ........................ 62/176.3 |
| 3,189,085 A | * | 6/1965 | Eberhart ...................... 62/156 |
| 2004/0020228 A1 | * | 2/2004 | Waldschmidt et al. ........ 62/234 |

FOREIGN PATENT DOCUMENTS

| DE | 19518281 | 12/1995 |
| DE | 19731369 | 7/1998 |
| DE | 19807341 | 9/1999 |

* cited by examiner

Primary Examiner—William E. Tapolcai
(74) Attorney, Agent, or Firm—Wood, Phillips, Katz, Clark & Mortimer

(57) ABSTRACT

A method and apparatus for drying the surface of a heat exchanger in a vehicle of moisture accumulating as a result of its use as an evaporator in an air conditioning system. Air is first heated by the heater core in the air conditioning system and then directed through the heat exchanger. Because of the reduced humidity of such air, any residual moisture in the heat exchanger is evaporated and is discharged to the environment. Where the system is used in a vehicle, it prevents the discharge of moist air onto the windows and/or windshield of the vehicle and thus minimizes or eliminates fogging of the windshield.

15 Claims, 6 Drawing Sheets

METHOD AND APPARATUS FOR DRYING A HEAT EXCHANGER IN A VEHICULAR AIR CONDITIONING SYSTEM

FIELD OF THE INVENTION

This invention relates to vehicular air conditioning systems, and more specifically, to a method and apparatus for removing residual condensate from a heat exchanger used as an evaporator or an evaporator/condenser/gas cooler with a minimum of energy expenditure.

BACKGROUND OF THE INVENTION

In many vehicular air conditioning installations, the heater core and the evaporator (or if a heat pump system, the evaporator/condenser/gas cooler) are-arranged serially in the direction of air flow. Typically, the planes of the heat exchangers are arranged approximately parallel to one another and in line with one another so that the air, as one of the heat exchange mediums, flows approximately perpendicularly through the two heat exchangers. While this type of arrangement works generally well for its intended purpose, it accentuates the depth of the air conditioning unit in an environment where there are greater constraints on depth than on length.

As a consequence, there have been proposed air conditioning installations wherein the heat exchangers are in a common plane or intersect at an angle. This sort of arrangement has a very compact construction from the depth standpoint which is advantageous for installations in motor vehicles. One such arrangement is shown in a German patent publication DE 195 18 281 A1. One problem that is encountered is caused by moisture, namely condensate, that is formed in the heat exchanger that forms part of a conventional vapor compression air conditioning system or functions as an evaporator/condenser/gas cooler in a heat pump system. When the system is turned on, the condensate may be entrained or evaporate into the air stream and may be deposited on the windshield of the vehicle causing fogging thereof.

To avoid this, after the air is cooled in the heat exchanger, a reheat operation is necessary to lower the relative humidity of the air and conduct dry air to the interior of the vehicle. From the standpoint of energy economy, the reheating operation is undesirable since the entire air stream is cooled in the evaporator with a corresponding energy expenditure, and then is reheated again, using energy.

The specific problem of drying of the heat exchanger core of the evaporator is not addressed in DE 195 18 281 A1. It is possible that an electrical heating element is arranged before the evaporator for this purpose. However, using an electrical heater to achieve drying requires a corresponding utilization of electrical energy as does the initial heating of the air itself. Frequency, neither is desirable and in the arrangement illustrated in the German patent publication, fan air first flows through the evaporator and then optionally through a heater core.

Use of electrical heating to accelerate drying of the evaporator in such a system is known from German patent publication DE 197 31 369 C1 in which the evaporator and heater are arranged serially in the direction of air flow. Consequently, depth of the unit is relatively great. The unit can but does not necessarily have to operate utilizing a reheat operation with initial cooling of the evaporator air and then reheating it again. In the reheat operation, the surface of the evaporator becomes wet and when the air conditioning operation is initiated subsequent to that, the moisture in the evaporator enters into the inside of vehicle and can lead to fogging of the windows. In this construction, the necessity of drying the evaporator is signaled by a sensor and the electrical heater arranged before the evaporator energized, which has an adverse effect on energy consumption.

In order to minimize energy consumption, it has been known to utilize a heat pump in the air conditioning installation where the heat exchanger is alternatively used as either an evaporator or as a condenser or gas cooler. When switching functions from evaporator operation to condenser or gas cooler operation, it is important to dry the heat exchanger core to minimize the amount of moisture in the air that flows through it. A goal of the invention is to accomplish that with a minimum energy expenditure.

SUMMARY OF THE INVENTION

It is a principal object of the invention to provide a new and improved air conditioning system for utilization in a vehicle. More specifically, it is an object of the invention to provide such an air conditioning system that has a minimum depth for ease of installation and/or requires a minimum input of energy to operate it. It is also a primary object of the invention to provide a new and improved method of operating an air conditioning system intended for use in a vehicle.

An exemplary embodiment of an air conditioning system achieving the foregoing objects includes a heater core having an air side and a coolant side in heat exchange relation with one another. The coolant side is adapted to receive liquid coolant from a propulsion source or the like, typically, but not always, an internal combustion engine. A refrigerant heat exchanger is also provide and has an air side and a refrigerant side in heat exchange relation with one another. The refrigerant side is adapted to be connected in a vapor compression cooling system or in a heat pump system to receive a refrigerant therefrom. The heater core and the heat exchanger are in end to end relation and at an angle to one another. The angle is in the range of an acute angle to about 180°. A housing is provided to contain the heater core and the heat exchanger and the housing includes an air inlet, a conditioned air outlet adapted to discharge conditioned air into a vehicle compartment, a windshield outlet adapted to direct conditioned air to the windshield of a vehicle, and a moist air outlet adapted to discharge moist air from a vehicle. A first flow control vane is located in the housing and is operable to (a) prevent or (b) allow direct air flow from the inlet to the heat exchanger. Also included is a second flow control vane in the housing operable to (a) prevent air flow from the inlet through the heater core or (b) allow air flow from the inlet through the heater core to the heat exchanger and the moist air outlet. A third flow control vane is provided in the housing and is operable to (a) open or (b) close the moist air outlet while a fourth flow control vane is located in the housing for (a) opening or (b) closing the conditioned air outlet. A fifth flow control vane is located in the housing and is operable to (a) open or (b) close the windshield outlet.

As a result of the foregoing construction, when the first vane prevents direct air flow to the heat exchanger and the third vane is operated to open the moist air outlet, the second vane may be caused to allow air flow from the inlet through the heater core to be heated therein and then through the heat exchanger to evaporate any residual condensate thereon and then provide air flow to the moist air outlet to discharge through such outlet to avoid any flogging of the windshield or other windows in the vehicle.

In a preferred embodiment, the second vane is located within the housing to direct air passing through the heater core at the heat exchange air side when the second vane is operated to allow air flow from the inlet through the heater core to the heat exchanger.

A preferred embodiment contemplates that the first and second vanes be movably mounted within the housing on opposite sides of the heater core and the heat exchanger. In a highly preferred embodiment, the first and second vanes are pivotally mounted on axes defining a plane extending approximately between the heater core and the heat exchanger.

In a preferred embodiment, the moist air outlet is in close proximity to the heat exchanger in the direction of air flow through the heat exchanger air side when the second vane is operated to allow air flow from the inlet through the heater core to the heat exchanger and when the first vane is operated to prevent direct air flow from the inlet to the heat exchanger.

In one embodiment of the invention, the heat exchanger is adapted to be connected to a heat pump system and is further adapted to function alternatively as an evaporator or as a condenser/gas cooler.

Preferably, the inlet includes a fresh air port and a passenger compartment port with a sixth flow control vane associated with both of the ports and operable to control the quantity of air entering both of the ports. A fan is disposed within the housing and located downstream of the ports and upstream of the heater core and the heat exchanger.

A highly preferred embodiment contemplates that the heater core be located closer to the ports than the heat exchanger and that the heat exchanger be located closer to the moist air outlet than the heater core.

As alluded to previously, the invention also contemplates a method of operating an air conditioning system. Specifically contemplated is a method for drying the surface of a heat exchanger in a vehicular heat pump air conditioning system and having a moist air outlet and a heater core connected to receive hot coolant from a propulsion source for the vehicle. The method includes the steps of (a) operating the heat pump air conditioning system to cause the heat exchanger to function as a condenser/gas cooler and (b) directing air with a fan first through the heat core and then through the heat exchanger to the moist air outlet.

In a preferred embodiment, steps (a) and (b) are performed after the propulsion source is turned off, and a coolant pump is operated to cause coolant flow through the heater core after the propulsion source is turned off. Thereafter, the method contemplates turning off the coolant pump and the fan.

In a highly preferred embodiment of the method, the coolant pump is turned off shortly before or substantially simultaneously with the turning off of the fan.

Other objects and advantages will become apparent from the following specification taken in connection with the accompanying drawings.

DESCRIPTION OF THE PREFERRED EMBODIMENTS

Figure 1:
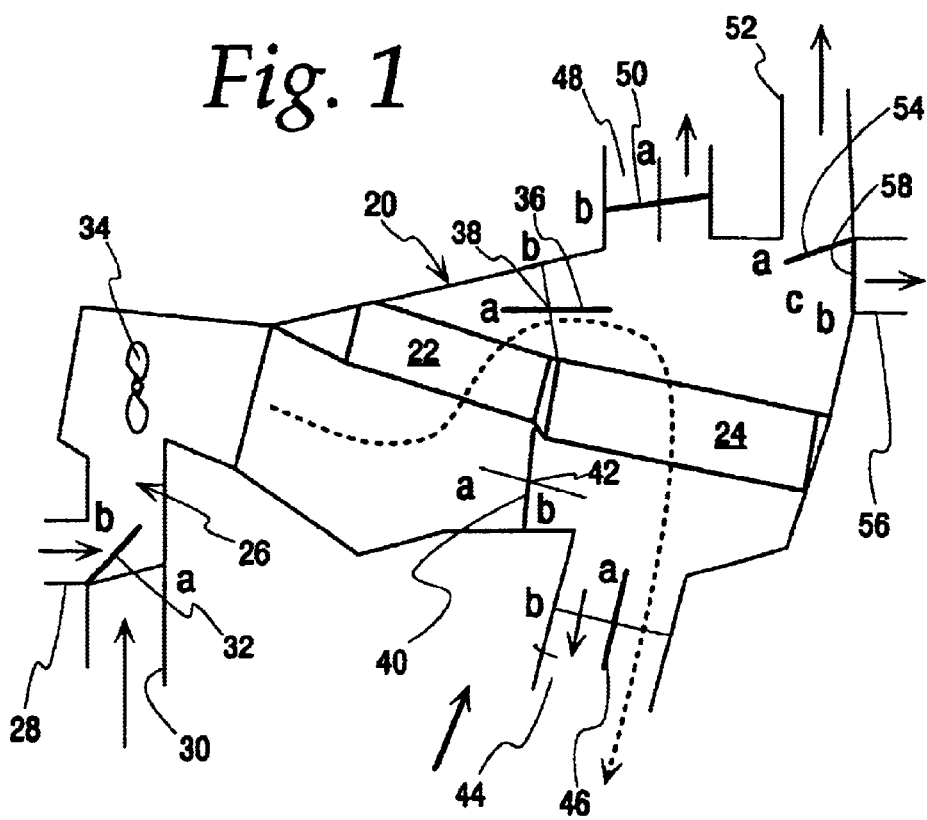
FIG. 1 is a somewhat schematic view of an air conditioning system made according to the invention with its components configured to perform a drying operation for removing condensate from a heat exchanger after its use as an evaporator.

The present invention, and the illustrated embodiments thereof, will be described in the context of an air conditioning system utilized in a vehicle. However, it is to be noted that the system is not limited to use in a vehicle but may be utilized with efficacy where spatial constraints are of concern and/or where it is desirable to dry a heat exchanger employed as an evaporator with a minimum energy expenditure. Thus, no limitation to a vehicle is intended except insofar as specified in the appended claims.

It is also to be noted that the invention may be utilized in a vapor compression cooling system employing conventional refrigerants such as HFC 134a as well as transcritical refrigerants such as $CO_2$. The system may be utilized strictly for cooling or may be a heat pump system utilized for both heating and cooling. Thus, a heat exchanger within the unit may be utilized only as an evaporator in a cooling only system but will be utilized alternatively as an evaporator or a condenser in a heat pump system. Moreover, in a heat pump system using a transcritical refrigerant, such heat exchanger will be used alternatively as an evaporator or as a gas cooler. Hence, the term condenser/gas cooler connotes a function that will either cause the refrigerant to condense in the case of conventional refrigerants or to be cooled as in the case of transcritical refrigerants. The term evaporator/condenser/gas cooler refers to the heat exchanger utilized in a heat pump system that may function as either an evaporator and a condenser or as an evaporator and a gas cooler.

To the extent referred to herein, "ambient" air is that contained within the compartment being heated or cooled, typically the passenger compartment of a vehicle. "Fresh" air refers to air drawn from outside of the compartment that will ultimately be discharged into the compartment, and "discharge into the environment" refers to air that is discharged to a location outside of the compartment being heated or cooled.

With the foregoing in mind, an embodiment of the invention will now be described with reference to FIG. 1.

An air conditioning unit made according to the invention includes a housing, generally designated 20, in which first and second heat exchangers 22 and 24 are located in end to end relation. The heat exchanger 22 is conventionally referred to as a heater core which may be of conventional construction to have an air side and a coolant side. The coolant side will typically include a plurality of tubes through which a hot coolant is flowed while the air side will include spaces between the tubes that are typically bridged by fins and through which air may pass in a direction generally transverse to the plane of the heat exchanger 22.

The heat exchanger 24 is similarly conventionally constructed and functions as an evaporator in a cooling only system but may alternatively be utilized as a condenser or gas cooler in a heat pump system.

The housing 20 includes an inlet area, generally designated 26, through which air may flow into the interior of the housing 20. The inlet area 26 includes a first port 28 which serves as a fresh air port, and a second port 30 which is adapted to be connected to the interior of the compartment to be heated or cooled, typically, the interior of the vehicle passenger compartment. A pivotal vane 32 is mounted near the junction of the ports 28 and 30 for movement between an "a" position whereat the vane 32 fully opens the fresh air port 28 and closes the compartment air port 30, and a position "b" which closes the fresh air port 28 and opens the compartment air port 30. The vane 32 may also be moved to intermediate positions in which both fresh air and compartment air may travel into the interior of the housing 20.

Just downstream of the inlet area 26 is a conventional fan 34, typically electrically driven to draw air into the housing 20 through one or the other or both of the ports 28 and 30 and discharge the air into that part of the housing 20 containing the heater core 22 and the heat exchanger 24.

Within the housing 20 is an additional vane 36 pivotable about an axis 38 on one side of the heater core 22 and the heat exchanger 24.

A further vane 40 is pivotable about an axis 42 and is located on the opposite side of the heater core 22 and heat exchanger 24 from the vane 36.

When the vane 36 is moved to the "b" position, air flow through the heater core 22 is blocked while when it is in the "a" position, air flow through the heater core 22 is permitted.

When the vane 40 is in the "b" position, it blocks direct air flow from the inlet area 26 to the heat exchanger 24 while when it is in the "a" position, air flow from the inlet area 26 directly to the heat exchanger 24 is permitted.

In close proximity to the heat exchanger 24 is a moist air outlet 44 which is connected to the environment, that is, to a point outside of the compartment to heated or cooled. It is provided with a pivotal vane 46 movable between an "a" position opening the moist air outlet 44 and a "b" position closing the moist air outlet 44.

Additional outlets from the housing 20 are disposed on the opposite side of the heater core 22 and heat exchanger 24 from the inlet area 26 and include an outlet 48 provided with a pivotal vane 50 movable between an "a" position opening the outlet 48 and a "b" position closing the outlet 48. In the usual case, the outlet 48 will be connected to the compartment to be heated or cooled, typically at a somewhat elevated level as, for example, discharge vents formed in the dash of an automobile.

A further outlet 52 is typically connected to discharge ports adjacent windows of the vehicle including specifically the windshield thereof and possible others. A vane 54 is movable between an "a" position closing the windshield outlet 52 and a "c" position opening the same.

Finally, an outlet 56 is provided and is typically connected to discharge ports in the lower area of the compartment to be heated or cooled, for example, at the floor level of a vehicle. The outlet 56 is provided with a pivotal vane 58 movable between a "b" position closing the outlet 56 and the "c" position opening the foot area outlet 56.

The components are illustrated in FIG. 1 as they would be during an operation intended to eliminate accumulated moisture on the heat exchanger 24 after it has been used as an evaporator. In this case, air is drawn into the inlet area 26 by the fan 34 either through the fresh air inlet 28 or the compartment inlet 30 or both and caused to flow in the direction of a dotted arrow 60. This flow path takes it first through the heater core 22 where the air is heated by heat exchanger with heated coolant flowing through the heater core 22. In the usual case, the source of the heated coolant will be coolant used for cooling the propulsion source of the vehicle, typically an internal combustion engine. However, the invention is not limited to use with vehicles utilizing internal combustion engines. For example, cooling systems in fuel cell vehicles used to utilize to cool the fuel cell could be the source of the heated coolant. After the now heated air emerges from the heater core 22, much of it impinges upon the vane 38 which, in its "a" position, deflects a quantity of such air in the direction of a heat exchanger 24. The air passes through the heat exchanger 24 and because it has been heated, its relative humidity will be reduced, causing evaporation of residual moisture on the heat exchanger 24. The air is then directed through the moist air outlet 44 to be discharged to the environment.

Short circuiting of the air flow path is prevented by the fact that the vane 40 is in a closed position.

One feature of the invention is the locating of the pivotal axes 38 and 42 for the vanes 36 and 40 so that they are parallel and define a common plane passing through the interface of the heater core 22 and the heat exchanger 24. This location enhances the ability of the vane 36 to direct the heated air toward the heat exchanger 24 while preventing short circuiting as mentioned previously.

Figure 2:
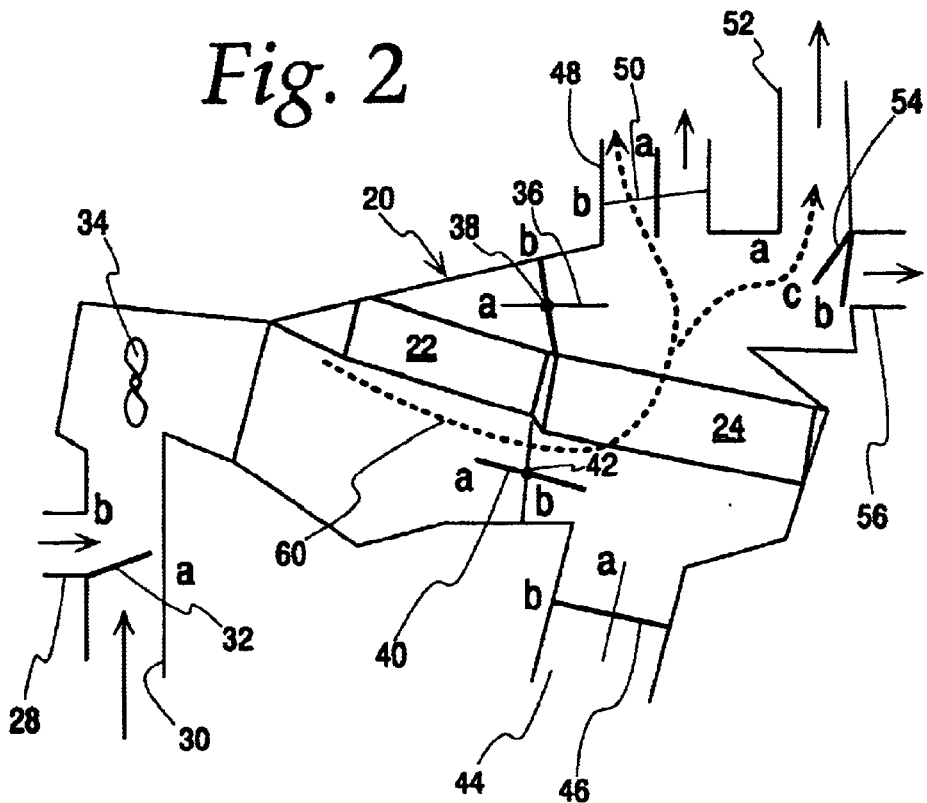
FIG. 2 is a view similar to FIG. 1 but with the components configured to provide a cooling operation.

FIG. 2 illustrates the same components as shown in FIG. 1 but in a different configuration, namely, a configuration intended to provide cooling air to the various outlets. In this case, either or both of the inlet ports 28 and 30 may be opened by the flow control vane 32 as desired and the fan 34 causes air flow in the directed of a dotted, branched arrow 60. The vane 36 is in its "b" or closed position while the vane 40 is in its "a" or open position. Consequently, flow through the heater core 22 is blocked while the air is directed to the heat exchanger 24. The closed air outlet 44 is closed by the flow control vane 46. Whether the system is a heat pump system or a cooling only system, the air is cooled within the heat exchanger 24 acting as an evaporator and is discharged through the compartment outlet 48 whose flow control vane 50 is in the "a" or open position. It may also be discharged through the windshield outlet 52 and/or the foot area outlet 56 dependent upon the location of the flow control vanes 54 and 58.

Figure 3:
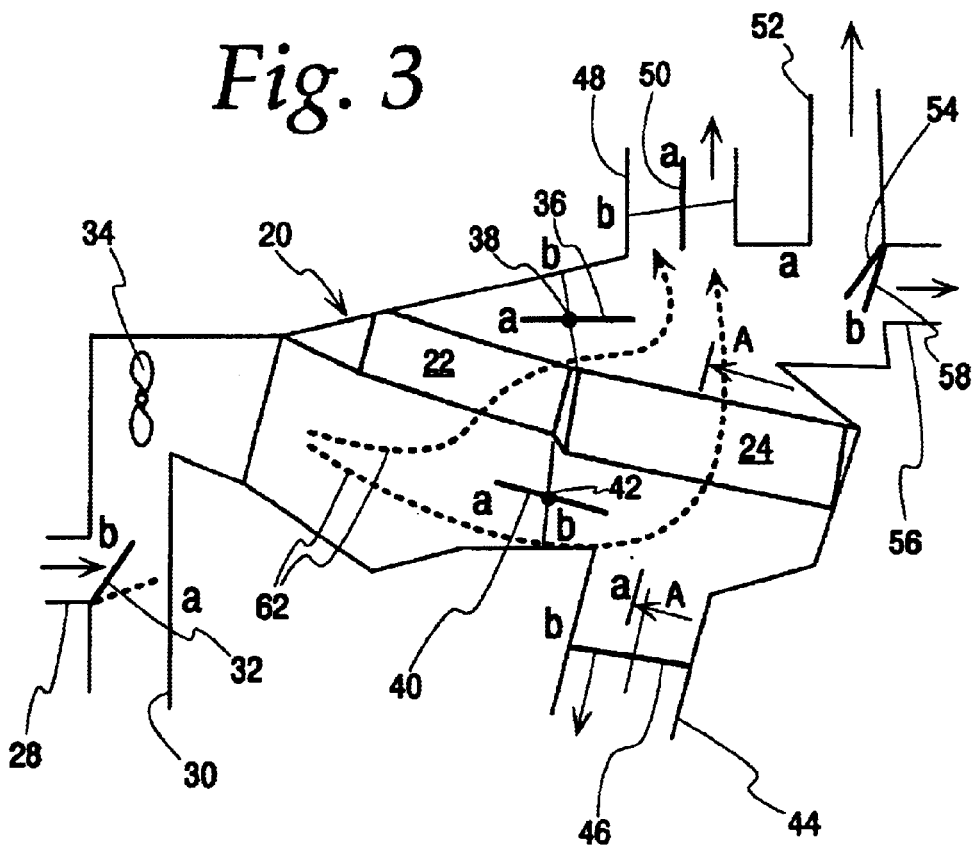
FIG. 3 is a view similar to FIGS. 1 and 2 but with the components configured to mix heated fresh air and cooled fresh air to achieve a desired temperature.

FIG. 3 illustrates the same components as they would be configured for a maximum heating operation where the heat exchanger 24 is in a heat pump system and therefore can act as both an evaporator and a condenser or as an evaporator and a gas cooler. In this case, air is drawn into the housing 20 through the compartment inlet port 30 and passed in a flow pattern indicated by two dotted arrows, collectively designated 62. In this case, both the vane 36 and the vane 38 are in their "a" or open positions while the flow control vane 46 is in its "b" or closed position closing the moist air outlet 44. As a consequence, air flow will pass through both the heater core 22 to be warmed by hot coolant therein and through the heat exchanger 24 which, in a heating mode in a heat pump system, will be condensing or cooling refrigerant and thus provide heating action. Discharge of the heated air may take place through any one, any two or all three of the outlets 48, 52 or 56 as desired, dependent upon the setting of the respective flow control vanes 50 and 54.

Figure 4:
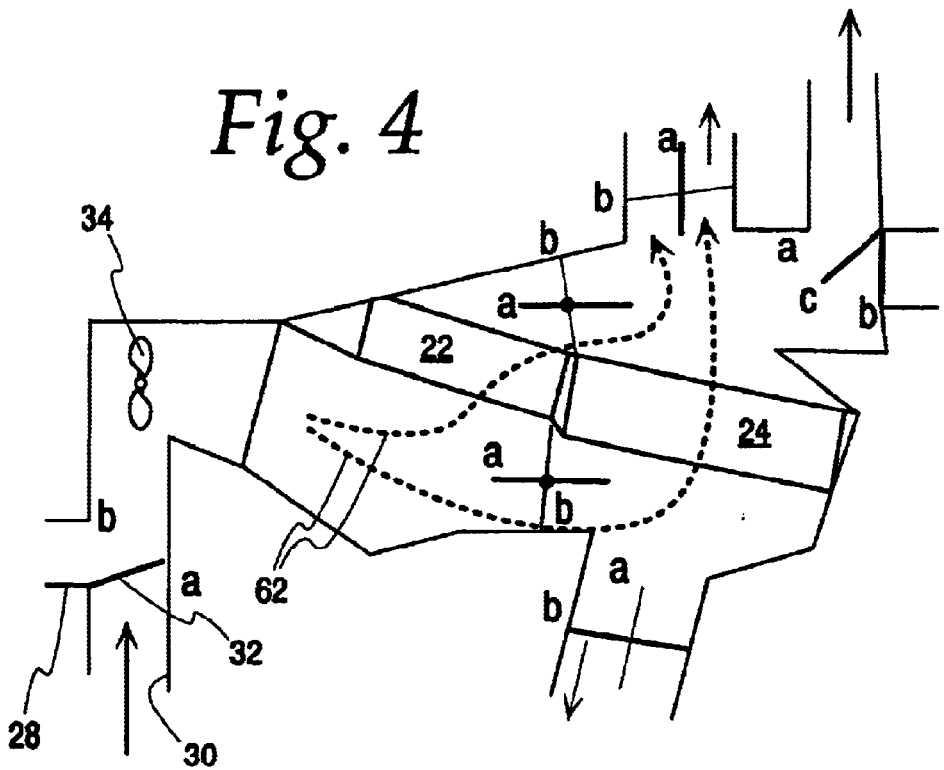
FIG. 4 is a view similar to FIG. 3 where the heat exchanger is part of heat pump and the components are configured to provide maximum heat using passenger compartment air.

FIG. 4 illustrates essentially the same configuration of components for a heating operation as FIG. 3. In essence, all of the components are in the same position or settings that are shown in FIG. 3. However, at this time, the fresh air port 28 is opened by the vane 32 while the compartment port 30 is closed. Maximum heating of fresh air will be obtained.

Figure 5:
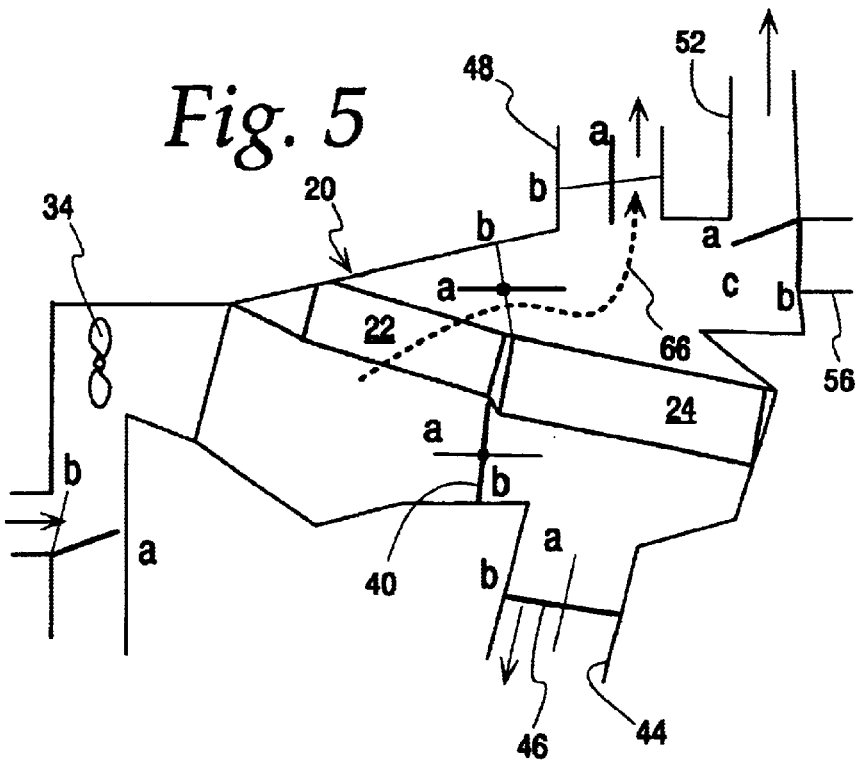
FIG. 5 is a view similar to FIG. 4 but showing the components configured to provide less than maximum heat.

FIG. 5 shows a configuration of the components when less than maximum heat with a maximum energy saving is desired. In this case, the components may be essentially as illustrated in FIGS. 3 or 4 except that the flow control vane 40 is in its "b" or closed position so that air flows through the housing 20 and the heater core 22 only in the direction of a dotted arrow 66. No air flow occurs through the heat exchanger 24 because the vane 46 is its closed position, blocking the moist air outlet 44 and the flow control vane 40 is in its closed position preventing direct air flow to the heat exchanger 24 in the direction of the outlets 48, 52, 56. Thus, the heat pump system may be in an off condition so that no energy is expended in working on the refrigerant thereof. All heat is supplied from the heated coolant passing through the heater core 22.

Figure 6:
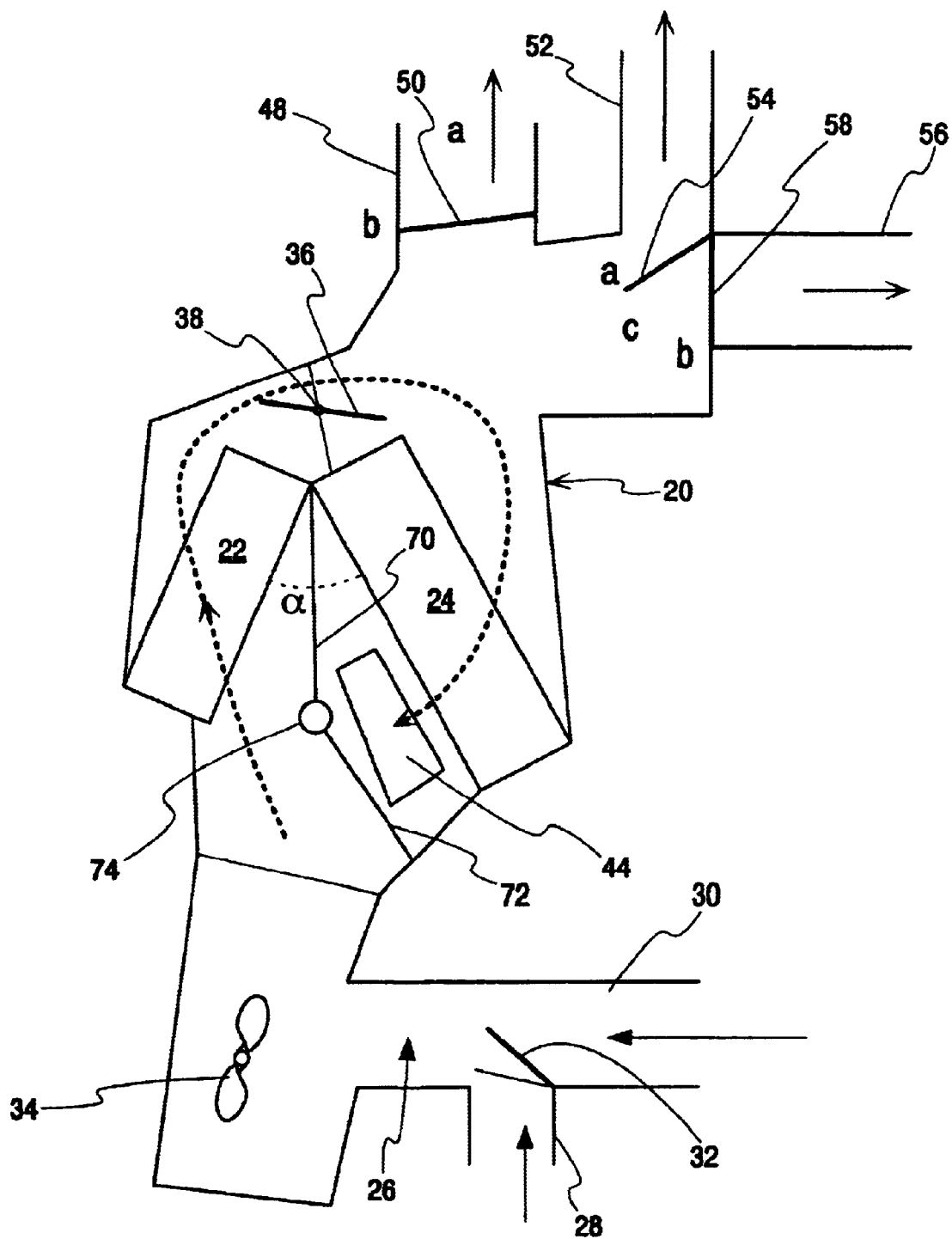
FIG. 6 is a schematic view of an alternative embodiment of the invention wherein a heater core and a heat exchanger are not coplanar as in the embodiment of FIGS. 1–5.

FIG. 6 illustrates an alternative embodiment of the invention wherein the heater core 22 and the heat exchanger 24 are not coplanar as in the embodiments of FIGS. 1-5. Specifically, the heater core and the heat exchanger 24 are still in end to end relation but are at an acute angle α, to each other. In this case, the vane 36 is retained while on the opposite side of the heater core and the heat exchanger 24, a fixed baffle 70 extends between the heat exchangers 22 and 24 from their interface to a vane 72 pivotable about an axis 74 which, again, together with the axis 38 for the vane 36 define a plane that extends between the heater core 22 and the heat exchanger 24. The components are shown in a condition whereby the air is heated first by hot coolant 22 in the heater core and then passes through the heat exchanger 24 to the moist air outlet 42. Short circuiting of air is prevented by the flow control vane 72 which blocks direct air flow from the inlet area 26 to the heat exchanger 24. The flow control vane 72 corresponds approximately to the flow control vane 40 in the embodiments of FIGS. 1-5 and can be moved from the position illustrated blocking direct air flow to the heat exchanger 24 to a position on the opposite side of the axis 74 allowing direct air flow to the heat exchanger 24 while blocking direct air flow to the heater core 22. Similarly, the vane 72 may be located between the positions just described to allow direct air flow to both the heater core 22 and the heat exchanger 24 for maximum heating.

It should be noted that in the configuration of components illustrated in FIG. 6, the flow control vane 54 for the windshield outlet 52 is partially opened to allow some of the heated air to pass to prevent fogging. The partial opening of the flow control vane 54 for the same purpose can also be accomplished in the embodiments of FIGS. 1-4. It is also to be noted that by appropriately choosing the opening of the flow control vane 36 in the embodiment of FIG. 6, the same can be made to direct some of the air stream passing through the heater core 22 in the direction of the heat exchanger 24.

Those skilled in the art will readily recognize that the embodiment of FIG. 6 may be operated through the various modes heretofore described in connection with the description of FIGS. 1-5.

Figure 7:
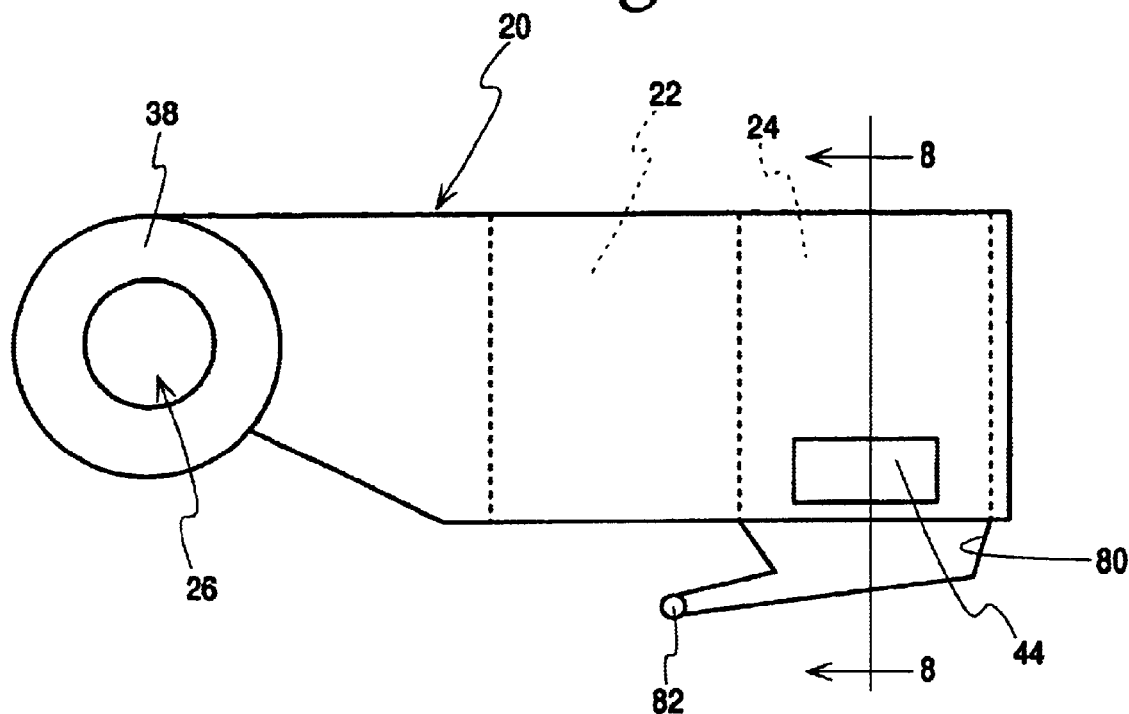
FIG. 7 is a vertical elevation of a housing utilizing the invention.
Figure 8:
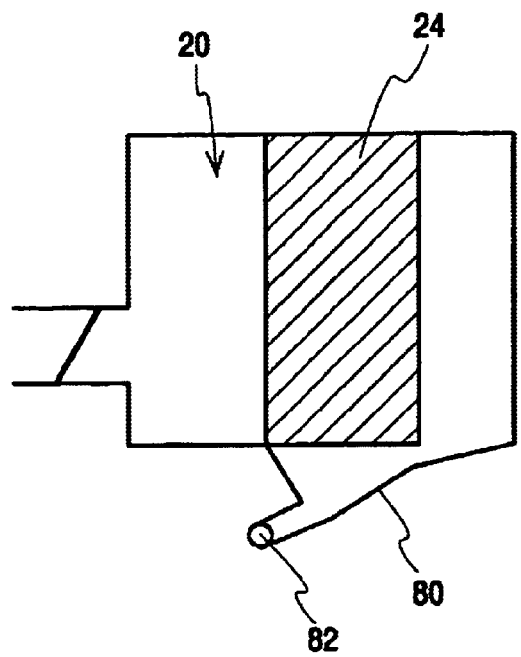
FIG. 8 is a vertical section of the housing.

FIG. 7 illustrates the provision of a condensate trough 80 having a narrowed outlet 82 disposed within or as part of the housing 20 below the heat exchanger 24. Condensate on the heat exchanger 24 that occurs during its operation may flow downwardly to be captured in the trough 80 and flow to a narrowed condensate outlet 82 which can be continuously open. This means of condensate removal assures that residual condensate on the heat exchanger 24 will be minimized. FIG. 8 depicts the same construction as it would approximately appear taken along the section line 8—8 in FIG. 7.

Figure 9:
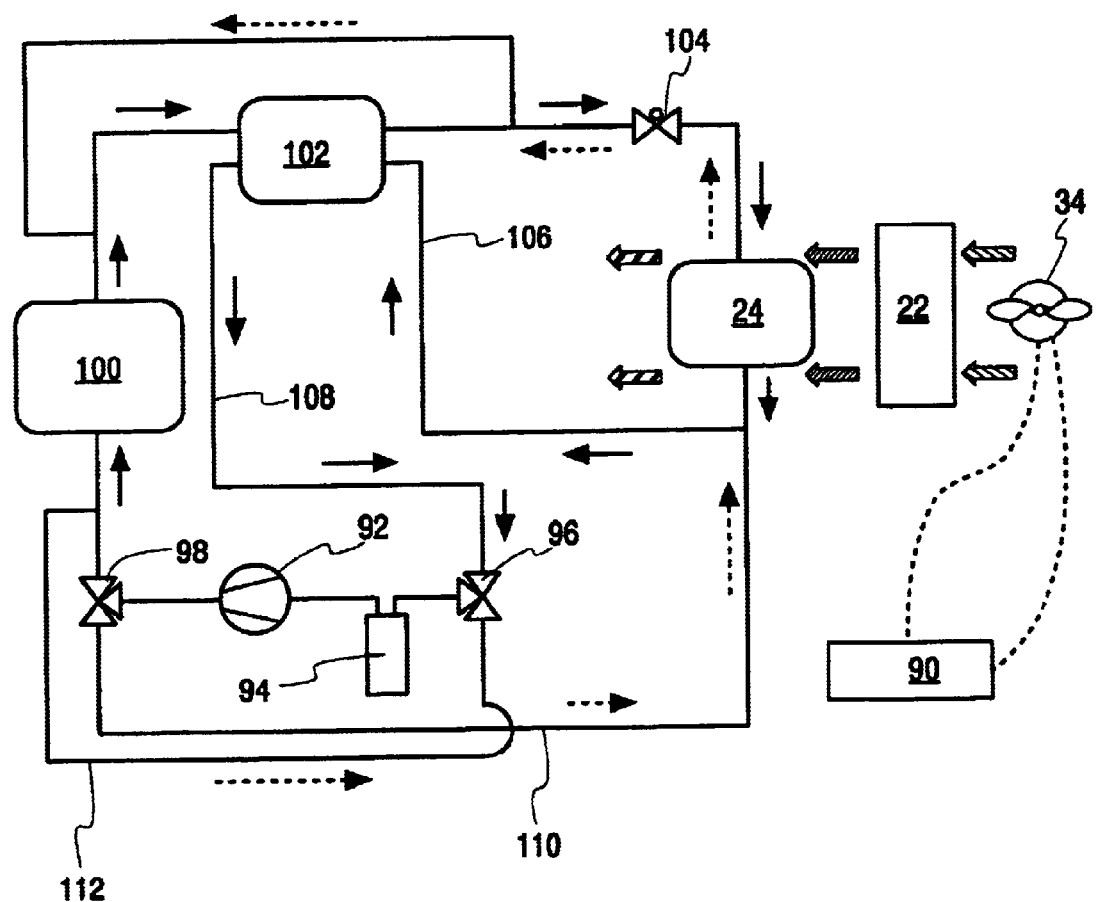
FIG. 9 is a system diagram of an air conditioning installation made according to the invention, specifically a heat pump system.

FIG. 9 schematically illustrates a heat pump system with which the invention may be utilized and which may perform the method of the present invention even without the specific configuration of the heater core 22 and heat exchanger 24 heretofore described. For example, they could be located serially as schematically illustrated in FIG. 9. In any event, in the interest of brevity, like reference numerals will be utilized for like components. Heavy black arrows show circulation of refrigerant when used for cooling and dotted line arrows show the circulation of refrigerant when the heat pump cycle is performing a heating operation.

The fan 34 may be connected by any suitable controls to a battery or generator 90. A system compressor is illustrated at 92 and includes an accumulator 94 on its suction side. A three way valve 96 is located on the upstream side of the accumulator and connected thereto while a similar three way valve 98 is located on the high pressure side of the compressor 92. A further heat exchanger 100 is provided. The heat exchanger acts as a condenser or gas cooler when the heat exchanger 24 is employed as an evaporator and acts an evaporator when the heat exchanger 24 is utilized as a condenser or gas cooler. Further, a suction line heat exchanger 102 is also connected into the system as illustrated.

Further provided is an expansion valve 104. In a cooling mode, the valve 98 is operated to direct compressed refrigerant form the compressor 92 to the heat exchanger 100 where it is cooled or condensed, depending upon the refrigerant employed. From there, the refrigerant is passed through the suction line heat exchanger 102 where it is further cooled by being placed in heat exchange relation with expanded refrigerant flowing in a line 106 from heat exchanger 24 which is now being utilized as an evaporator.

From the suction line heat exchanger 102, the cooled refrigerant is passed to the expansion valve 104 where its pressure is reduced allowing the same to expand within the heat exchanger 24 to cool air passing therethrough as a result of operation of the fan 34. The refrigerant is then returned on a line 108 to the three way valve 96 where it is directed to the accumulator 94.

When the system is operated in a heating mode, the three way valve 98 is configured to direct compressed, hot refrigerant to a line 110 through which it travels to the heat exchanger 24 to be cooled by air directed through it by the fan 34. At this time, the heat exchanger 24 is acting as a condenser or a gas cooler, dependent upon the refrigerant being employed. In any event, the air stream passing through the heat exchanger 24 at this time is heated.

Ultimately, the refrigerant exiting the heat exchanger 24, now cooled by air from the fan 34, passes through the expansion valve 104 and then to the heat exchanger 100 which is now acting as an evaporator.

After exiting the heat exchanger 100, the refrigerant passes through a line 112 which returns it to the three way valve 96 which directs it to the accumulator 94 and ultimately to the compressor 92.

In order to remove any residual moisture within the heat exchanger 24 as alluded to previously, the air is first heated within the heater core 22 when the remainder of the system is in the heating mode. As a consequence, the heat exchanger 24 will heat up as it is acting as a condenser or a gas cooler to cause evaporation of such residual moisture which may then be directed to the moist air outlet 44 (FIGS. 1-5) as mentioned previously.

It will be noted in this mode of operation, it is not necessary that the air be heated within the heater core 22 because heat to effect drying will be transferred to the air side of the heat exchanger 24 by the heat pump operation.

Figure 10:
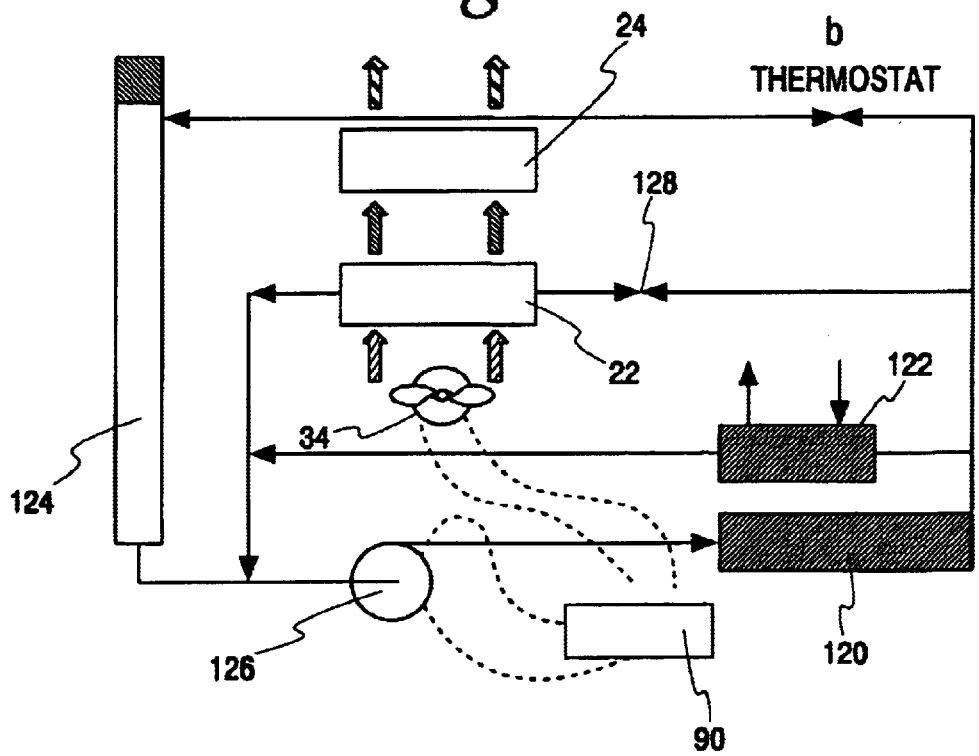
FIG. 10 is a system schematic of components utilized in a cooling cycle, including provision for drying the heat exchanger after its use as an evaporator.

In some cases, it be desirable to provide for drying of the heat exchanger 24 when the engine of the vehicle is turned off. Such a process will be described with reference to FIG. 10 in which a vehicle propulsion source, typically an engine, is illustrated at 120. A power source such as a battery or a generator is against shown at 90 and an air cooler 122 may also be included the circuit. The vehicle radiator for cooling propulsion source coolant is shown at 124 and a coolant circulating pump shown at 126. The coolant circulating pump 26 may be in lieu of or in addition to the so-called "water pump" typically employed with liquid cooled engines.

By suitable switches not shown, when the engine 120 is turned off, the fan 34 and the water pump 126 continue to operate or are turned on using the battery or are automatically switched to the battery 90 by the system generator in order to continue and remain in operation. As a consequence, the engine coolant, which will still be hot as a result of residual heat, flows through the heater core 22 through a control valve 128 which typically will be open at this time. As a result, air directed by the fan 34 through the heater core 22 will still be heated and its relative humidity reduced. The preheated and low relative humidity air stream is passed through the heat exchanger 24 to cause evaporation of any residual moisture therein which can then be discharged to the environment through the moist air outlet 44 in the manner mentioned previously.

When the heat exchanger 24 is dried, the pump 126 and the fan 34 may be turned off. Further, in some cases, where the residual heat in the coolant is relatively high, it is possible to de-energize the pump 126 before de-energizing the fan 34 to further conserve energy.

What is claimed is:

1. An air conditioning system for a vehicle, comprising:
    a heater core having an air side and a coolant side in heat exchange relation with one another, said coolant side being adapted to receive liquid coolant from an engine or the like;
    a refrigerant heat exchanger having an air side and a refrigerant side in heat exchange relation with one another, said refrigerant side being adapted to be connected in a vapor compression cooling system or in a heat pump system to receive a refrigerant therefrom;
    said heater core and said heat exchanger being in end to end relation and at an angle to one another, said angle being in the range of an acute angle to about 180°;
    a housing containing said heater core and said heat exchanger, said housing including;
        an air inlet;
        a conditioned air outlet adapted to discharge conditioned air into a vehicle compartment,
        a windshield outlet adapted to direct conditioned air to the windshield of a vehicle; and
        a moist air outlet adapted to discharge moist air from a vehicle;
    a first flow control vane in said housing operable to (a) prevent or (b) allow direct air flow from said inlet to said heat exchanger;
    a second flow control vane in said housing operable to (a) prevent air flow from said inlet through said heater core or (b) allow air flow from said inlet through said heater core to said heat exchanger and said moist air outlet;
    a third flow control vane in said housing operable to (a) open or (b) close said moist air outlet;
    a fourth flow control vane in said housing for (a) opening or (b) closing said conditioned air outlet; and
    a fifth flow control vane in said housing operable to (a) open or (b) close said windshield outlet;
    whereby when said first vane prevents direct air flow to said heat exchanger and said third vane is operated to open said moist air outlet, said second vane may be caused to allow air flow from said inlet through said heater core to be heated therein and then through said heat exchanger to evaporate any residual condensate thereon and then to said moist air outlet to be discharged through said moist air outlet.

2. The air conditioning system of claim 1 wherein said second vane is located within said housing to direct air passing through said heater core at said heat exchange air side when said second vane is operated to allow air flow from said inlet through said heater core to said heat exchanger.

3. The air conditioning system of claim 1 wherein said first and second vanes are movably mounted within said housing on opposite sides of said heater core and heat exchanger.

4. The air conditioning system of claim 3 wherein said first and second vanes are pivotally mounted on axes defining a plane extending approximately between said heater core and said heat exchanger.

5. The air conditioning system of claim 1 wherein said moist air outlet is in close proximity to said heat exchanger in the direction of air flow through said heat exchanger air side when said second vane is operated to allow air flow from said inlet through said heater core to said heat exchanger when said first vane is operated to prevent direct air flow from said inlet to said heat exchanger.

6. The air conditioning system of claim 1 wherein said heat exchanger is adapted to be connected to a heat pump system and is adapted to function as an evaporator or a condenser/gas cooler.

7. The air conditioning system of claim 1 wherein said inlet includes a fresh air port and a passenger compartment port with a sixth flow control vane associated with both said ports and operable to control the quantity of air entering both said ports; and a fan with said housing located downstream of said ports and upstream of said heater core and said heat exchanger.

8. The air conditioning system of claim 7 wherein said heater core is located closer to said ports than said heat exchanger and said heat exchanger is located closer to said moist air outlet than said heater core.

9. The air conditioning system of claim 8 wherein said first and second vanes are movably mounted within said housing on opposite sides of said heater core and heat exchanger.

10. The air conditioning system of claim 9 wherein said first and second vanes are pivotally mounted on axes defining a plane extending approximately between said heater core and said heat exchanger.

11. A method for drying the surface of a heat exchanger in a vehicular heat pump air conditioning system and having a moist air outlet and a heater core connected to receive hot coolant from a propulsion source for the vehicle comprising the steps of:

(a) operating the heat pump air conditioning system to cause the heat exchanger to function as a condenser/gas cooler; and (b) directing air with a fan first through the heater core and then through the heat exchanger to the moist air outlet.

12. The method of claim 11 wherein steps (a) and (b) are performed after the propulsion source is turned off, and a coolant pump is operated to cause coolant flow through the heater core after the propulsion source is turned off and thereafter turning off the coolant pump and the fan.

13. The method of claim 12 wherein the coolant pump is turned off shortly before or substantially simultaneously with the turning off of the fan.

14. A method for drying the surface of a heat exchanger in a vehicular air conditioning system and having a moist air outlet and a heater core connected to receive hot coolant from a propulsion source for the vehicle comprising the steps of:

(a) de-energizing the propulsion system while causing a pump for propulsion source coolant to direct hot coolant to the heater core;

(b) directing air with a fan first through the heater core and then through the heat exchanger to the moist air outlet; and (c) de-energizing the pump and the fan after the heat exchanger has been dried.

15. The method of claim 14 wherein the coolant pump is turned off shortly before or substantially simultaneously with the turning off of the fan.

* * * * *